Figure 1:
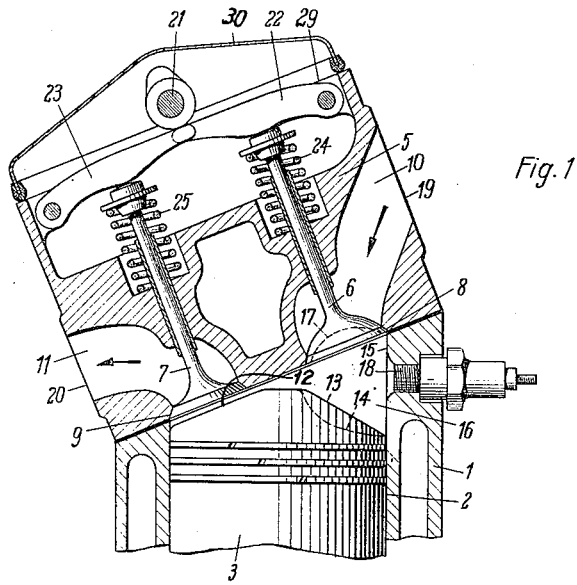

Oct. 16, 1956     R. L. H. KOSCHE     2,766,739
INTERNAL COMBUSTION ENGINE

Filed July 28, 1950     2 Sheets-Sheet 1

INVENTOR.
RUDOLF L. H. KOSCHE
By Dicke and Padlow
ATTORNEYS

Oct. 16, 1956 R. L. H. KOSCHE 2,766,739
INTERNAL COMBUSTION ENGINE
Filed July 28, 1950 2 Sheets-Sheet 2
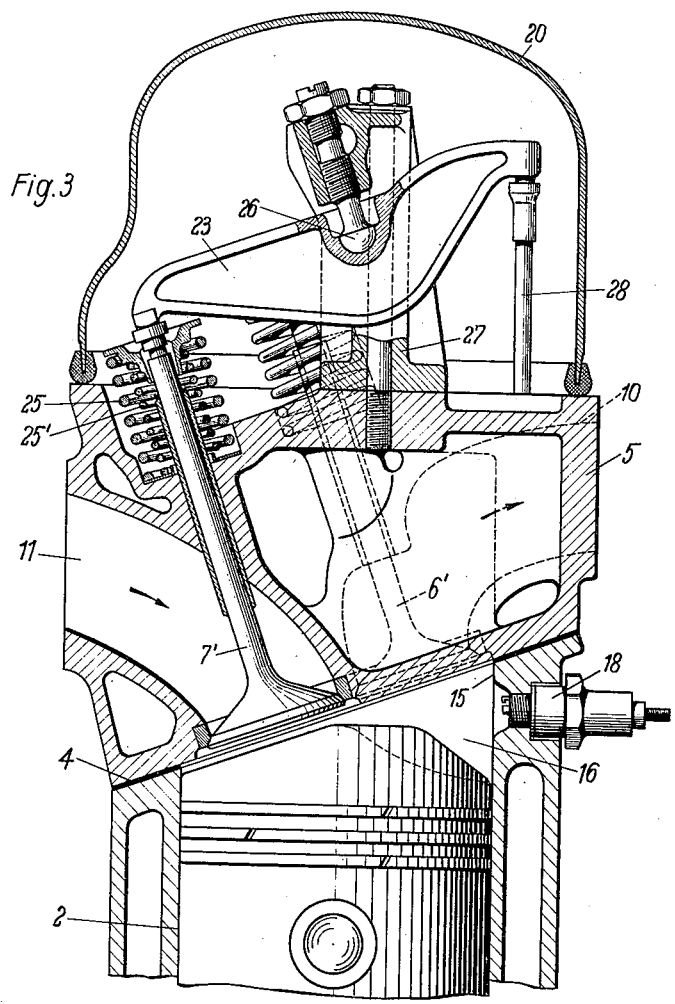
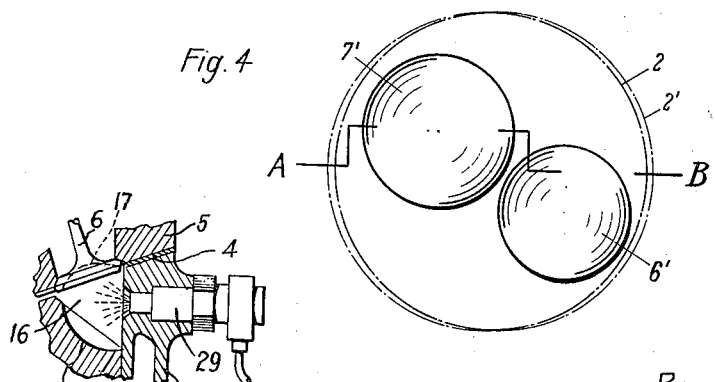
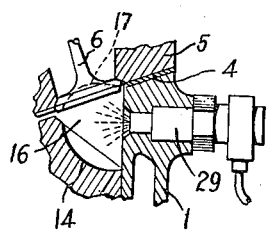
INVENTOR.
RUDOLF L. H. KOSCHE
By: Dicke and Padlon
ATTORNEYS _United States Patent Office_

2,766,739
Patented Oct. 16, 1956

2,766,739
INTERNAL COMBUSTION ENGINE

Rudolf L. H. Kosche, Stuttgart-Unterturkheim, Germany, assignor to Daimler-Benz Aktiengesellschaft, Stuttgart-Unterturkheim, Germany Application July 28, 1950, Serial No. 176,323

Claims priority, application Germany August 3, 1949

12 Claims. (Cl. 123—32)

The present invention relates to an internal combustion engine operating especially with compression of mixtures and ignition from external sources.

An object of the present invention is to provide a construction of an internal combustion engine wherein the valves may assume the largest possible valve section with a given cylinder diameter, i. e., the diameters of the valve seats may assume the largest possible safe dimension for a given cylinder diameter.

A further object of the present invention is to provide an improved accessibility to the cylinder head, and especially to the valves.

A further object of the present invention consists in a favorable construction of the combustion chamber, especially in connection with the arrangement of a spark plug, in spite of the unsymmetrical shape of the cylinder space.

Another object of the present invention is to provide the simplest possible construction of the cylinder head and of the engine.

Accordingly, an essential feature of the present invention consists in that the joining plane between the cylinder casing and the cylinder head is inclined with respect to the cylinder axis and that the inlet or outlet valve, or the inlet and/or outlet valves are arranged perpendicularly or nearly perpendicularly to the bottom of the cylinder head, preferably in such a way that the valve seats fit the joining plane as closely as possible. According to a further feature of the present invention, two valves, i. e., an inlet valve and an outlet valve are arranged side by side at the largest or nearly at the largest diameter of the essentially elliptic bottom area of the cylinder head closing the cylinder space.

Further features of the present invention relate to the particular construction of the upper part of the cylinder casing, of the piston head, of the cylinder head, of the valves, etc., especially in such a way that a combustion chamber located to one side above the piston head in the space defined by the angle between the wall of the cylinder casing and the cylinder head is formed which is of a hemispherical shape and in whose center of circle in the cylinder casing wall a spark plug or, in some cases, an injection nozzle may be suitably arranged.

In the accompanying drawing some preferred embodiments of the present invention are shown from which further features and advantages may be taken as illustrating the present invention.

Figure 2:
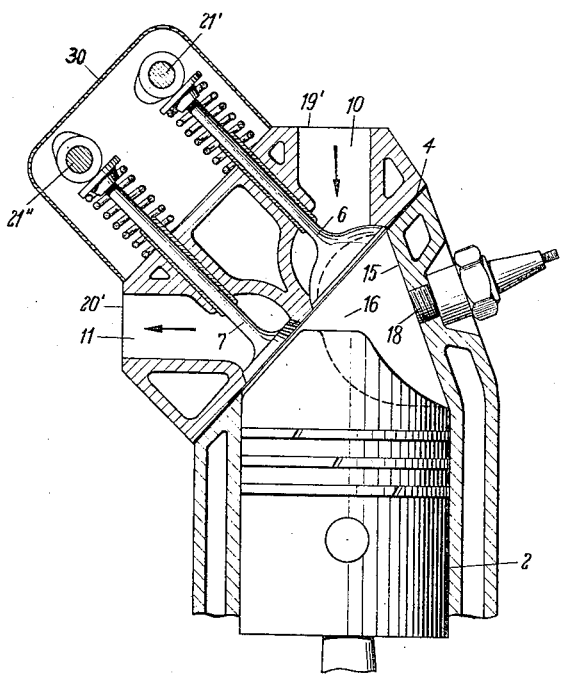

Figure 1 shows a partial vertical cross section through an engine with a cylinder which up to the joining plane is of a uniform cylindrical shape, Figure 2 a partial vertical cross section through an engine with a conical or inclined upper part of the cylinder casing, Figure 3 a partial vertical cross section through another embodiment of an engine corresponding to Figure 1 taken along line A—B of Figure 4, Figure 4 a view of the valve arrangement according to Figure 3, as seen from the bottom, and Figure 5 is a partial vertical section approximately corresponding to Figure 1 of an embodiment in accordance with the present invention in which, however, an injection nozzle is used in lieu of a spark plug.

Referring now to the drawing wherein like reference numerals are used throughout to designate like parts in the various figures thereof, and more particularly to Figure 1, reference numeral 1 designates a cooled cylinder casing having cylinder working surfaces 2 for engagement with piston 3 sliding therein, which piston 3 is shown in this figure in its top dead center position. The cylinder casing 1 is obliquely cut off at the top in such a way that a tightening surface or joining plane 4 is formed which is inclined relative to the cylinder axis and on which is placed the cylinder head 5 having valves 6 and 7 with the lower oblique tightening surface or joining plane of the cylinder head 5 corresponding in its dimensions to joining plane 4 formed by cylinder casing 1. Valve 6 which, for example, may be the inlet valve, and valve 7 which, for example, may be the outlet valve are arranged side by side substantially perpendicularly to the oblique joining plane 4, that is, inclined to one side of the cylinder axis. Within the cylinder head, the valve seats 8 and 9, which are essentially contiguous to the joining plane and thereby to the upper end wall for the working cylinder coinciding with this joining plane 4, control the passage areas 10 and 11 of the valves 6 and 7. The piston 3 has a piston head essentially peaked, roof-shaped or inclined on both sides whose piston head area 12 adjacent the lower part of the joining plane 4 closely approaches the valve 7 in the top dead center position of the piston, while the other side 13 is inclined in the opposite direction, and is provided with a concave curvature 14 which together with the casing wall 15 and the wall of the cylinder head or the valve 6 forms a combustion chamber 16.

In the embodiment according to Figure 1, the cylinder surface 2 serving as working surface for the piston is rectilinear up to the joining plane 4 in such a way that it forms simultaneously the wall 15 for the combustion chamber 16. The two valves 6 and 7 are suitably arranged at the largest diameter of the elliptic bottom area of the cylinder head closing the cylinder space which is delimited by the intersection of the cylinder surface 2 with the joining plane 4. The valve canal or passageway 10 runs approximately parallel to the cylinder axis, the valve canal or passageway 11 to the outside, on the other hand, extends at about a right angle to the cylinder axis.

The working areas or flange surfaces 19 and 20, which form the connecting surfaces for the inlet or the outlet pipes respectively, extend perpendicularly to the joining plane 4. A further joining plane 29 parallel with the joining plane 4 is also provided, on which the cover 30 is placed with the insertion of a gasket. The operation of the valves 6 and 7 is effected through a cam shaft 21 arranged at the cylinder head below the cover by the tappet levers 22 and 23 which open the valves against the force of the springs 24 and 25.

The combustion chamber 16 formed on the one side above the piston 3 is, in the upper dead center position of the piston, of approximately hemispherical shape, the base of the hemisphere being formed by the wall 15 of the cylinder casing and by the hemispherical areas of the concave curvature 14 in the piston head, on the one hand, and by the cylinder head, or the valve head of the valve 6 provided with a concave recess 17. The spark plug 18 is essentially arranged in the center of the circle of the hemispherical combustion chamber 16, while valve 7 is shielded against the hemispherical combustion chamber by section 12 of the piston head which closely approaches the valve in the top dead center position of the piston and thereby protects valve 7 against the hot explosion gases in the combustion chamber 16.

By the use of the hemispherical form for the combustion chamber and the arrangement of the spark plug, or the injection nozzle in the center thereof the flame or injection distances are of equal length in all directions. Furthermore, extremely short canal passages with a minimum of flow resistance and small condensation losses may be obtained with the inlet and outlet canals extending, for instance, parallel with or perpendicularly to the cylinder axis, as shown in Figure 1.

In Figure 1 the upper valve 6 is shown as inlet valve and the lower valve 7 as outlet valve. Therefore, the inflow of combustion mixtures entering through the valve 6 may directly fill the combustion chamber 16 and thereby help to cool the walls of the combustion chamber, while the outlet valve 7 is guarded against explosion gases by the piston bottom 12 at the moment of the ignition.

The valves may, furthermore, also be arranged vice versa, i. e., valve 6 as outlet valve and valve 7 as inlet valve. In this case, an advantage arises especially from the fact that an eventually advanced ignition causes less danger of knocking at the hot outlet valve 6 because of its vicinity to the normal ignition point. Besides, the burned gases can be removed more completely from the combustion chamber, if necessary.

By the particular inclined arrangement of the bottom of the cylinder head with respect to the cylinder axis the bottom area of the cylinder head closing the cylinder space may be enlarged by assuming an essentially elliptic shape. Accordingly, the valve may also obtain an extraordinarily large passage area without the valve seats protruding beyond the extent of the sidewalls of working cylinder.

The embodiment according to Figure 2 differs from that of Figure 1 essentially by the fact that the wall 15 of the working cylinder delimiting the combustion chamber 16 is conically shaped or provided with an area inclined with respect to the cylinder axis above the working surface of the piston corresponding to the basis of the hemisphere with the spark plug 13 at its center, which results in a location of the combustion chamber 16 more central to the cylinder axis. The valve canals 10 and 11 open into flange surfaces 19' and 20' which are inclined by 45° to the joining plane 4 which in turn has an inclination of 45° with regard to the cylinder axis. The canals 10 and 11, therefore, extend exactly vertically and horizontally respectively. This arrangement results under the given circumstances in especially favorable conditions for the construction thereof.

Furthermore, two special camshafts 21' and 21" are provided under the cover 30.

In the embodiment according to Figures 3 and 4 the valves 6' and 7' are controlled by a camshaft arranged below by the tappet lever 23 which, as shown for the valve 7', are supported by a joint 26 of a bearing stand 27 fastened to the cylinder head under the cover 20 and are operated by the push rods 28. The valves are closed by the springs 25, 25'. In Figures 3 and 4 the valve 7' is assumed to be the inlet valve, the valve 6' the outlet valve. Figure 4 shows how by the inclined arrangement of the joining plane 4 the cylindrical cross section 2 of the cylinder space is enlarged to the elliptical form 2' in the joining plane in such a way that larger valves may be arranged side by side. In this case the valves are, in consideration of the timing, somewhat displaced to opposite sides relative to the largest diameter extending in the direction A—B, i. e., the major axis of the ellipse formed by the joining plane.

Figure 5 shows an embodiment which, for instance, corresponds to Figure 1, in which, however, instead of the spark plug 18 an injection nozzle 29 is arranged in such a manner that the discharge end of the injection nozzle is arranged approximately in the center of the semicircular combustion chamber 16, the semi-spherical surfaces of which are formed by the hollow wall 14 of the piston and by the concave surface 17 of the valve 6.

The invention is not limited to the described embodiments but is susceptible of many modifications and changes within the spirit of the present invention, and I intend to cover such modifications and changes except as limited by the appended claims.

What I claim is:

1. A combustion engine including a cylinder casing, a cylinder head, both said cylinder casing and said cylinder head having a common joining plane inclined with respect to the cylinder axis, whereby the cylinder space is limited by said cylinder head forming an elliptic surface whose major axis slopes upwardly relative to a horizontal plane at right angle to the cylinder axis, a plurality of juxtaposed valves in said cylinder head, the axes of said valves being located side by side in the direction of said major axis of said ellipse, said valves having valve ends adjacent said joining plane, a piston in said cylinder casing having a peaked piston head inclined on both sides thereof, one of said sides being substantially parallel with and contiguous to said joining plane with said piston in top dead center position, the other of said sides forming a combustion chamber together with the wall portion of the cylinder casing extending to said joining plane and with a part of said cylinder head containing one of said valves, the end of said one valve and said other side of said piston head having a concave curvature to provide a substantially hemispherical combustion chamber with said piston in top dead center position, the part of said wall portion which lies in a plane including the cylinder axis and passing through the major diameter, extending substantially rectilinearly up to said joining plane and forming an angle with the working surfaces of said cylinder in said last-mentioned plane not exceeding 180° whereby the upper edge of said extended wall portion lies within the circumference of said cylinder, as seen in a top plan view thereof, and an injection nozzle located in the wall of said cylinder casing substantially in the center of said hemispherical combustion chamber.

2. A combustion engine including a cylinder casing, a cylinder head, both said cylinder casing and said cylinder head having a common joining plane inclined with respect to the cylinder axis, whereby the cylinder space is limited by said cylinder head forming an elliptic surface whose major axis slopes upwardly relative to a horizontal plane at right angle to the cylinder axis, a plurality of juxtaposed valves in said cylinder head, the axes of said valves being located side by side in the direction of said major axis of said ellipse, said valves having valve ends adjacent said joining plane, a piston in said cylinder casing having a peaked piston head inclined on both sides thereof, one of said sides being substantially parallel with and contiguous to said joining plane with said piston in top dead center position, the other of said sides forming a combustion chamber together with the wall portion of the cylinder casing extending to said joining plane and with a part of said cylinder head containing one of said valves, the end of said one valve and said other side of said piston head having a concave curvature to provide a substantially hemispherical combustion chamber with said piston in top dead center position, the part of said wall portion, which lies in a plane including the cylinder axis and passing through the major diameter, extending substantially rectilinearly up to said joining plane and forming an angle with the working surfaces of said cylinder in said last-mentioned plane not exceeding 180° whereby the upper edge of said extended wall portion lies within the circumference of said cylinder, as seen in a top plan view thereof, and a spark plug located in the wall of said cylinder casing substantially in the center of said hemispherical combustion chamber.

3. A combustion engine including a cylinder casing having an inclined end wall, a cylinder head, said cylinder casing and said cylinder having a common joining plane inclined to the cylinder axis, said cylinder casing providing a cylinder space, a piston sliding in said cylinder space having a peaked piston head inclined on both sides thereof, one of said sides being substantially parallel with and contiguous to said joining plane with said piston in top dead center position, the other of said sides forming together with said cylinder head a combustion chamber delimited by said joining plane and by the walls of said cylinder casing extended to said joining plane, the extended walls of said cylinder casing delimiting the combustion chamber extending up to said joining plane as cylindrical surfaces in continuous alignment with the cylinder surfaces forming the working surfaces for the piston, whereby said inclined end wall forms, in the plane of said joining plane, an ellipse within the circumference of the cylinder as seen from the top with the main axis of the ellipse coinciding with a line of maximum slope relatively to a plane perpendicular to the cylinder axis, an inlet valve and an outlet valve in said cylinder head having axes substantially perpendicular to said joining plane, said valves being located approximately on the major axis of said ellipse, one valve end forming part of said combustion chamber, and the side of said piston head forming part of said chamber being provided with a concave curvature formed in such a way that the combustion chamber assumes an essentially hemispherical form in the top dead center position of said piston.

4. A combustion engine including a cylinder casing having an inclined end wall, a cylinder head, said cylinder casing and said cylinder head having a common joining plane inclined to the cylinder axis, said cylinder casing providing a cylinder space, a piston sliding in said cylinder space having a peaked piston head with a portion thereof inclined substantially parallel to said common joining plane and closely approaching the same in the top dead center position of said piston, said piston forming with said cylinder head, a combustion chamber delimited by said joining plane and a wall portion of said cylinder casing extended to said joining plane as well as by another portion of said piston head, said extended wall portion of the cylinder casing delimiting said combustion chamber extending up to said joining plane as substantially straight surfaces in a plane including the cylinder axis and passing through said wall portion with the upper edge of said wall portion adjacent said joining plane lying within the confines of the cylinder, as viewed in the direction of the cylinder axis, whereby said inclined end wall, in the plane of said joining plane, forms essentially an ellipse within the circumference of the cylinder as seen from the top with the main axis of the ellipse coinciding with a line of maximum slope relative to a plane perpendicular to the cylinder axis, and an inlet valve and an outlet valve in said cylinder head having axes substantially perpendicular to said joining plane, said valves being located substantially on opposite sides of the minor axis of said ellipse, the valve end of the valve forming said combustion chamber and the side of said piston head delimiting said combustion chamber being provided with a concave curvature in such a way that the combustion chamber assumes an essentially hemispherical form in the top dead center position of said piston.

5. A combustion engine including a cylinder casing having an inclined end wall, a cylinder head, said cylinder casing and said cylinder head having a common joining plane inclined to the cylinder axis, said cylinder casing providing a cylinder space, a piston sliding in said cylinder space having a peaked piston head with a portion thereof inclined substantially parallel to said common joining plane and closely approaching the same in the top dead center position of said piston, said piston forming with said cylinder head an essentially hemispherical combustion chamber delimited by said joining plane and a wall portion of said cylinder casing extended to said joining plane as well as by another portion of said piston head, said extended wall portion of the cylinder casing delimiting said combustion chamber extending up to said joining plane as substantially straight surfaces in a plane including the cylinder axis and passing through said wall portion with the upper edge of said wall portion adjacent said joining plane lying within the confines of the cylinder, as viewed in the direction of the cylinder axis, whereby said inclined end wall, in the plane of said joining plane, forms essentially an ellipse within the circumference of the cylinder as seen from the top with the main axis of the ellipse coinciding with a line of maximum slope relative to a plane perpendicular to the cylinder axis and an inlet valve and an outlet valve in said cylinder head having axes substantially perpendicular to said joining plane, said valves being located substantially on opposite sides of the minor axis of said ellipse, said joining plane being inclined at an angle of 45 degrees relative to the cylinder axis, and further comprising a valve canal in said cylinder head for each of said valves, one of said valve canals extending essentially parallel and the other essentially perpendicularly to said cylinder axis.

6. A combustion engine including a cylinder casing having an inclined end wall, a cylinder head, said cylinder casing and said cylinder head having a common joining plane inclined to the cylinder axis, said cylinder casing providing a cylinder space, a piston sliding in said cylinder space having a peaked piston head with a portion thereof inclined substantially parallel to said common joining plane and closely approaching the same in the top dead center position of said piston, said piston forming with said cylinder head an essentially hemispherical combustion chamber delimited by said joining plane and a wall portion of said cylinder casing extended to said joining plane as well as by another portion of said piston head, said extended wall portion of the cylinder casing delimiting said combustion chamber extending up to said joining plane as substantially straight surfaces in a plane including the cylinder axis and passing through said wall portion with the upper edge of said wall portion adjacent said joining plane lying within the confines of the cylinder, as viewed in the direction of the cylinder axis, whereby said inclined end wall, in the plane of said joining plane, forms essentially an ellipse within the circumference of the cylinder as seen from the top with the main axis of the ellipse coinciding with a line of maximum slope relative to a plane perpendicular to the cylinder axis, and an inlet valve and an outlet valve in said cylinder head having axes substantially perpendicular to said joining plane, said valves being located substantially on opposite sides of the minor axis of said ellipse, said extended wall portion being inclined to the axis of said cylinder and to the cylinder surfaces of said cylinder serving as working surfaces for the piston.

7. A combustion engine including a cylinder casing having an inclined end wall, a cylinder head, said cylinder casing and said cylinder head having a common joining plane inclined to the cylinder axis, said cylinder casing providing a cylinder space, a piston sliding in said cylinder space having a peaked piston head with a portion thereof inclined substantially parallel to said common joining plane and closely approaching the same in the top dead center position of said piston, said piston forming with said cylinder head an essentially hemispherical combustion chamber delimited by said joining plane and a wall portion of said cylinder casing extended to said joining plane as well as by another portion of said piston head, said extended wall portion of the cylinder casing delimiting said combustion chamber extending up to said joining plane as substantially straight surfaces in a plane including the cylinder axis and passing through said wall portion with the upper edge of said wall portion adjacent said joining plane lying within the confines of the cylinder, as viewed in the direction of the cylinder axis, whereby said inclined end wall, in the plane of said joining plane, forms essentially an ellipse within the circumference of the cylinder as seen from the top with the main axis of the ellipse coinciding with a line of maximum slope relative to a plane perpendicular to the cylinder axis, and an inlet valve and an outlet valve in said cylinder head having axes substantially perpendicular to said joining plane, said valves being located substantially on opposite sides of the minor axis of said ellipse, said valves being offset with respect to the major diameter of said ellipse.

8. A combustion engine including a cylinder casing having an inclined end wall, a cylinder head, said cylinder casing and said cylinder head having a common joining plane inclined to the cylinder axis, said cylinder casing providing a cylinder space, a piston sliding in said cylinder space having a peaked piston head with a first portion thereof inclined substantially parallel to said common joining plane and closely approaching the same in the top dead center position of said piston, and with a second portion thereof inclined in the opposite direction from said first portion and being curved, said piston forming with the second curved portion, with said cylinder head and with said cylinder an essentially hemispherical combustion chamber, which is delimited by said joining plane, by said second portion and by a wall portion of said cylinder casing extended to said joining plane, said extended wall portion of the cylinder casing delimiting said combustion chamber extending up to said joining plane as substantially straight surfaces in a plane including the cylinder axis and passing through said wall portion, said extended wall portion forming a well-defined angle with said joining plane along the upper edge of said extended wall portion, said upper edge adjacent said joining plane lying within the confines of the cylinder, as viewed in the direction of the cylinder axis, whereby said inclined end wall in the plane of said joining plane forms essentially an ellipse within the circumference of the cylinder as seen from the top, the main axis of said ellipse coinciding with a line of maximum slope relative to a plane perpendicular to the cylinder axis, and an inlet valve and an outlet valve in said cylinder head having axes substantially perpendicular to said joining plane, said valves being located substantially on opposite sides of the minor axis of said ellipse.

9. A combustion engine according to claim 8, further comprising means in the wall of said cylinder casing located essentially in the center of the hemispherical combustion chamber for initiating the combustion process in said combustion chamber.

10. A combustion engine according to claim 9, wherein said last-mentioned means is a spark plug.

11. A combustion engine according to claim 9, wherein said last-mentioned means is an injection nozzle.

12. A combustion engine according to claim 8, wherein one of said valves is located higher than the other, and wherein said cylinder head includes a first valve canal for the higher valve and a second valve canal for the lower valve, said first valve canal extending substantially parallel to the cylinder axis and said second valve canal extending substantially perpendicularly to said cylinder axis.

References Cited in the file of this patent

UNITED STATES PATENTS

| | | |
|---|---|---|
| 2,012,895 | Sidney | Aug. 27, 1935 |
| 2,016,734 | Wittenberg | Oct. 8, 1935 |
| 2,028,760 | Dillstrom | Jan. 28, 1936 |
| 2,061,826 | Bremser | Nov. 24, 1936 |
| 2,126,939 | Winfield | Aug. 16, 1938 |
| 2,133,592 | Taub | Oct. 18, 1938 |
| 2,214,941 | Taub | Sept. 17, 1940 |
| 2,227,853 | Turner | Jan. 7, 1941 |
| 2,282,435 | Swaine | May 12, 1942 |
| 2,428,886 | MacPherson | Oct. 14, 1947 |

FOREIGN PATENTS

| | | |
|---|---|---|
| 174,145 | Great Britain | Jan. 13, 1922 |
| 247,729 | Great Britain | Feb. 25, 1926 |
| 326,801 | Great Britain | Mar. 19, 1930 |
| 2,164 | Australia | Aug. 18, 1931 |